T. M. WATSON.
COTTON PLANTER.
APPLICATION FILED JAN. 25, 1909.
929,176.
Patented July 27, 1909.
4 SHEETS—SHEET 1.
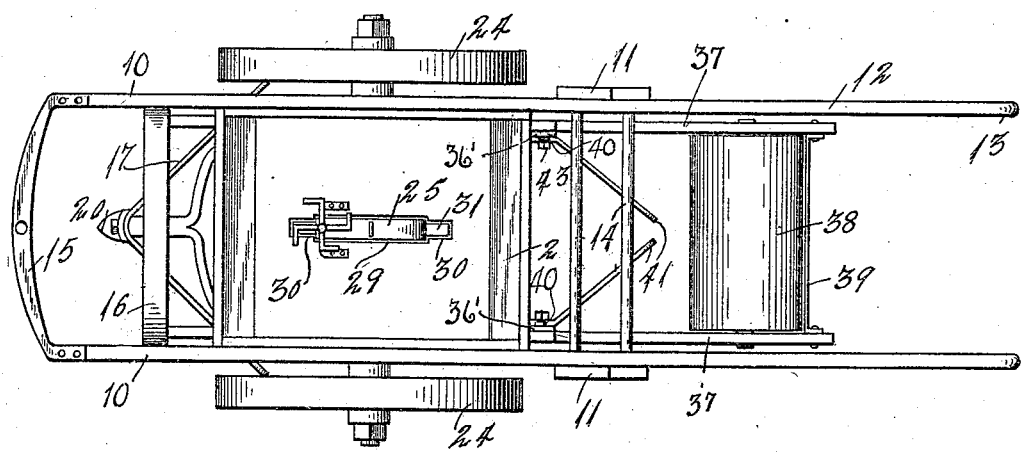
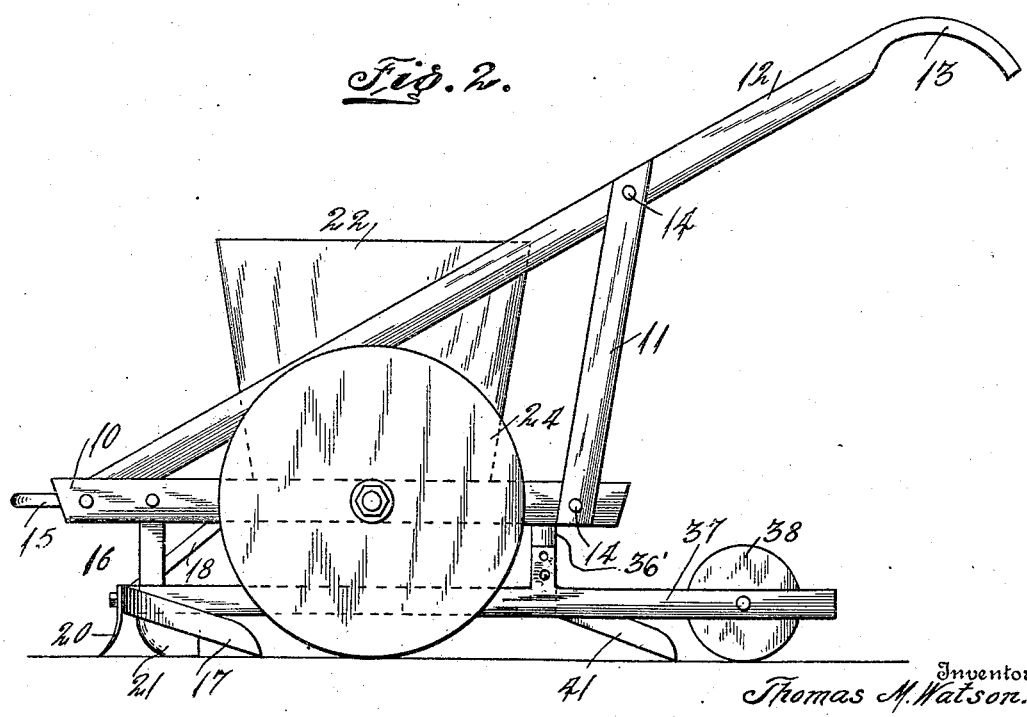
Witnesses
Jos Gregory
Inventor
Thomas M. Watson.
By Chandler & Chandler
Attorney T. M. WATSON.
COTTON PLANTER.
APPLICATION FILED JAN. 25, 1909.
929,176.
Patented July 27, 1909.
4 SHEETS—SHEET 2.
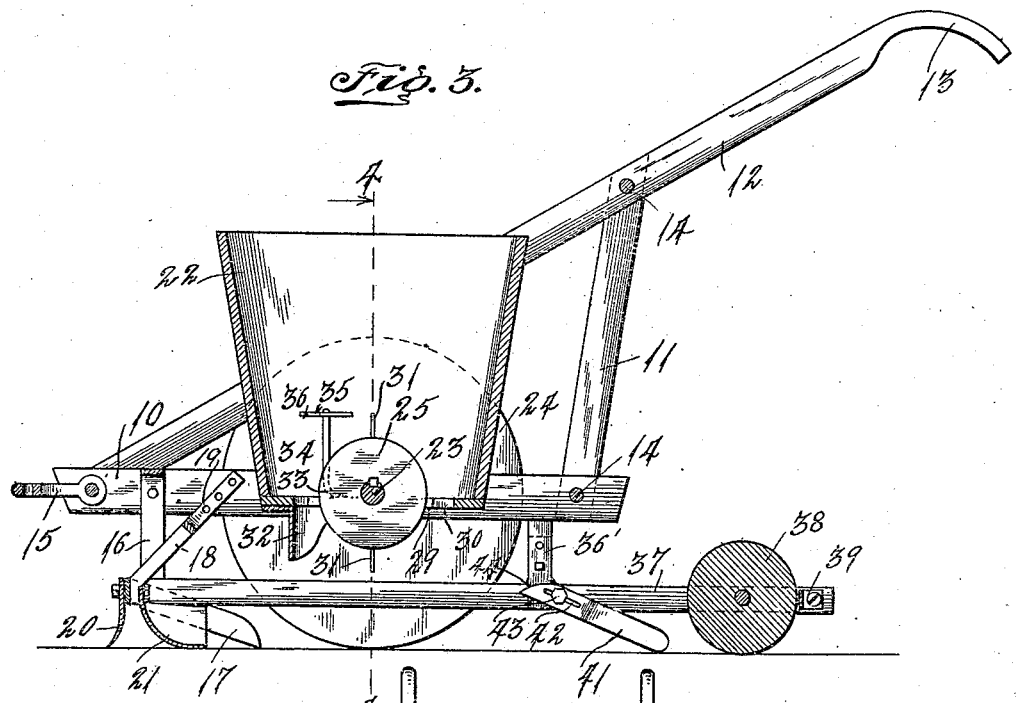
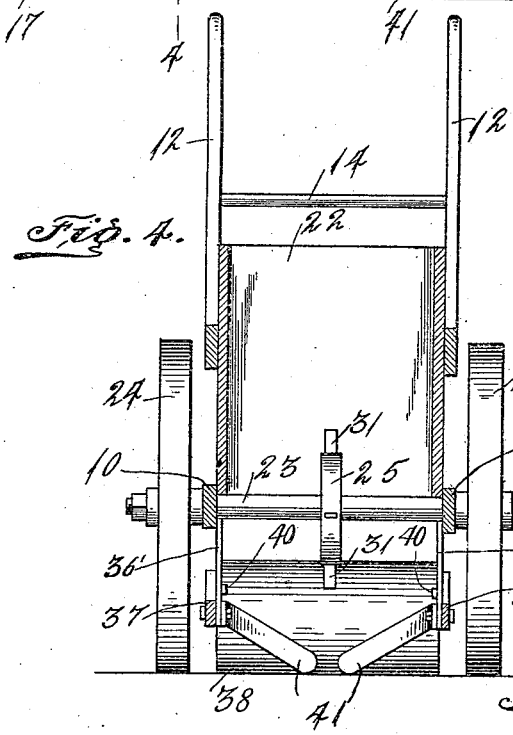
Witnesses
Jos Gregory
V. M. Gillis
Inventor
Thomas M. Watson.
By Chandler & Chandler
Attorney T. M. WATSON.
COTTON PLANTER.
APPLICATION FILED JAN. 25, 1909.
929,176.
Patented July 27, 1909.
4 SHEETS—SHEET 3.
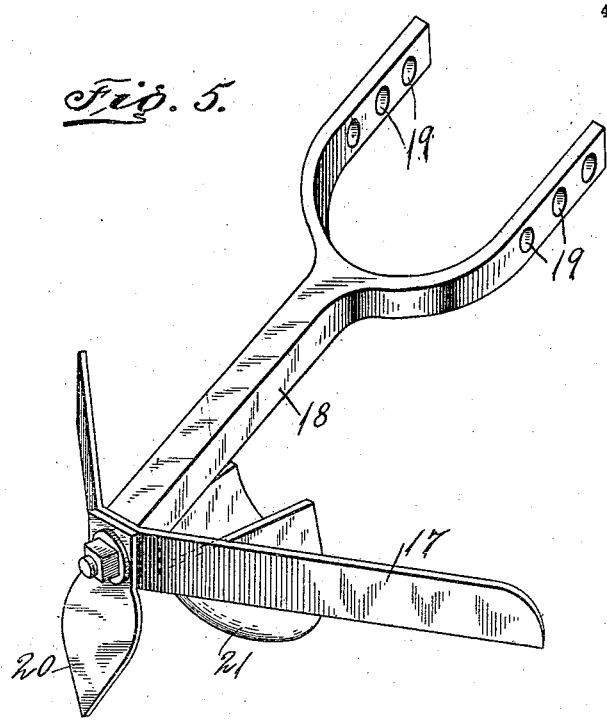
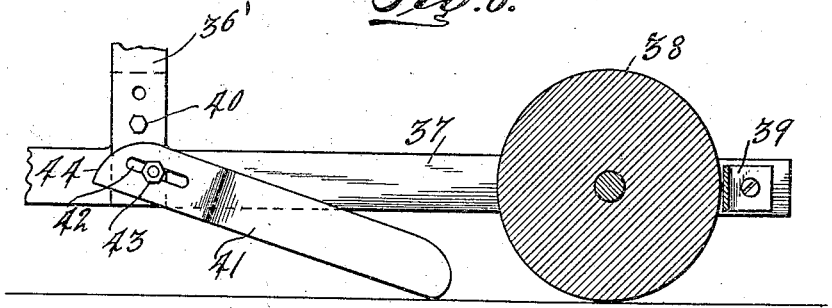
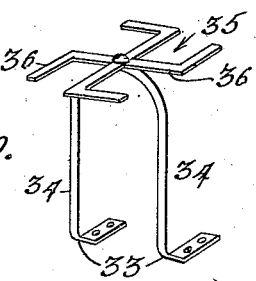
Inventor
Thomas M. Watson.
Witnesses
Jos Gregory.
By Chandler & Chandler
Attorney

T. M. WATSON.
COTTON PLANTER.
APPLICATION FILED JAN. 25, 1909.

929,176.

Patented July 27, 1909.
4 SHEETS—SHEET 4.

Inventor
Thomas M. Watson.

Witnesses
Jos Gregory.

By
Attorney

UNITED STATES PATENT OFFICE.

THOMAS M. WATSON, OF MAXTON, NORTH CAROLINA.

COTTON-PLANTER.

No. 929,176.  Specification of Letters Patent.  Patented July 27, 1909.

Application filed January 25, 1909. Serial No. 474,104.

*To all whom it may concern:*

Be it known that I, THOMAS M. WATSON, a citizen of the United States, residing at Maxton, Route 4, in the county of Robeson, State of North Carolina, have invented certain new and useful Improvements in Cotton-Planters; and I do hereby declare the following to be a full, clear, and exact description of the invention, such as will enable others skilled in the art to which it appertains to make and use the same.

This invention relates to agricultural implements and has special reference to a novel form of cotton planter.

One object of the invention is to improve the general construction of devices of this character.

A second object of the invention is to provide an improved form of feeding device for the seed so that they may be planted at predetermined intervals.

A third object of the invention is to provide an improved agitator for the seed to prevent them from choking up and ceasing to feed.

With the above and other objects in view, the invention consists, in general, of an improved form of cotton planter provided with a novel seed feeding wheel and agitator.

The invention further consists in certain novel details of construction and combinations of parts hereinafter fully described, illustrated in the accompanying drawings, and specifically set forth in the claims.

In the accompanying drawing, like characters of reference indicate like parts in the several views.

Figure 7:
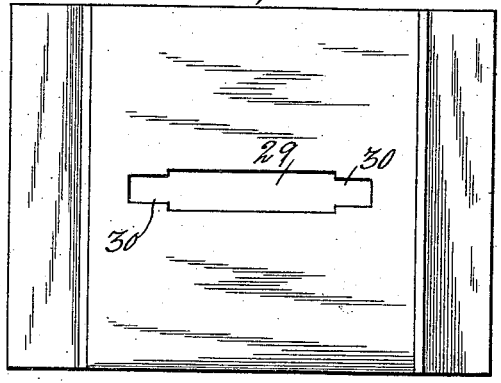
Figure 8:
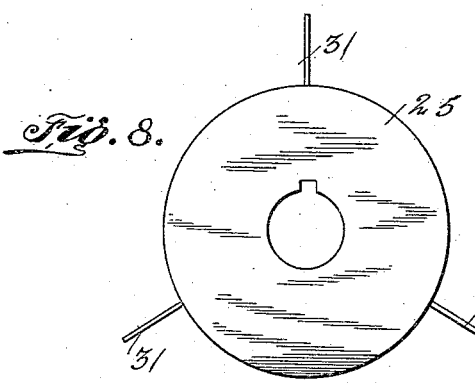
Figure 9:
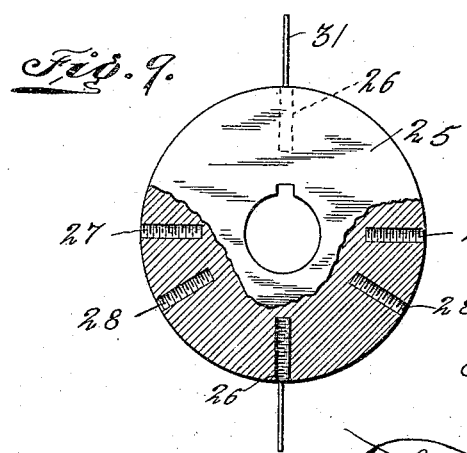

Figure 1 is a top plan view of a cotton planter constructed in accordance with this invention. Fig. 2 is a side elevation thereof. Fig. 3 is a longitudinal median section through the invention showing the feeding wheel arranged to feed every twenty-four inches. Fig. 4 is a transverse section on the line 4—4 of Fig. 3. Fig. 5 is an enlarged detail view showing the method of adjusting the drill and opener blades. Fig. 6 is a similar view showing the method of adjusting the covering shares. Fig. 7 is a bottom plan view of the seed box. Fig. 8 is a view of the feeding wheel as arranged to feed every sixteen inches. Fig. 9 is a similar view of the wheel as arranged to feed every twelve inches. Fig. 10 is a perspective view of the improved agitator.

The main frame of the machine consists of a pair of spaced longitudinally extending bars 10 at the rear ends of which are mounted stays 11. Connected to the front end of the members 10 and the top end of the members 11 are handles 12 having the usual grips 13. These members are held apart by means of suitable brace rods 14 and at the front end of the beams 10 is pivotally mounted a clevis 15. Extending downward from the beams 10 are certain standards 16 whereon are mounted leveling wings 17.

At 18 is a stay, the arms of which are provided at their ends with a plurality of bolt holes 19 whereby they may be attached to the respective members 10. Upon the forward end of this stay is mounted a root cutter 20 and a drill 21 is also held on the stay, both the drill and root cutter being adjustable for depth by means of the respective bolt holes 19.

At 22 is a seed box which may be of any preferred construction and this seed box is securely mounted between the members 10. Through the seed box and supported in suitable bearings on the members 10 extends an axle 23 having upon each end a traction wheel 24, these wheels being securely keyed to the axle so that the axle revolves as the wheels are turned.

Extending through the floor of the seed box is a feeding wheel 25 which forms one of the principal parts of my invention. This wheel 25 is securely keyed or otherwise fastened on the axle 23 and is provided around its periphery with oppositely disposed screw threaded recesses 26. At right angles to the screw threaded recesses 26 are similar recesses 27, and at an angle of 120° from one of the recesses 26 are still other recesses 28. This wheel is preferably so proportioned that the recesses 26 will be twelve circumferential inches from the recesses 27 and consequently twenty-four circumferential inches from each other. Furthermore, the recesses 28 will be sixteen circumferential inches apart and consequently each one will be sixteen circumferential inches from one of the recesses 26. This wheel passes through a suitable slot 29 in the bottom of the box and at each end of this slot are provided slightly narrower extensions as indicated at 30, the body of the wheel fitting closely within the body of the slot 29. Adapted to fit in the various recesses are certain feeding fingers 31 arranged to pass through the slots 30 as the wheel 25 revolves. Forward of the wheel and immediately below the forward slot 30 is a seed spout 32. It will now be plain that according to the various positions of the feeding fingers 31 seed will be fed through the seed spout as the wheel revolves so that the fingers 31 may be so positioned on the wheel 25 that the seed will be fed twelve, sixteen or twenty-four inches apart as may be desired, and this without making it necessary to take the machine apart, it being simply required to properly position the feeding fingers 31 to accomplish this result. It will also be obvious that by this arrangement the seeds are fed in bunches and that these bunches will have a direct relation in point of number of seed contained to the distance apart at which they are planted.

In order to keep the seed within the box from clogging and jamming, upon each side of the wheel 25 there are provided suitable feet 33 from which extends a standard 34 of U shape. Upon this standard 34 is mounted an agitator 35 provided with a plurality of arms 36 arranged at angles to the body of the agitator, and these arms are adapted to be struck by the respective fingers 31 as the wheels 25 revolve, thus causing the agitator to not only revolve, but also to vibrate. It will be obvious that this vibration and stirring up of the seed at the front of the box prevents the same from clogging and allows the seed to be properly fed as it is stirred up.

Extending downwardly from the members 10 is a pair of standards 36' upon the lower end of each of which is mounted an arm 37 and between the rear ends of these arms are supported a roller 38 and a resilient scraper 39 adapted to press against the roller and keep it free from mud and dirt. These arms 37 are attached to the standards 36' by means of suitable rivets one of which has a head 40 which extends well above the surface of each of the arms 37 on the inner side thereof. Covering shovels 41 each provided with a slot 42 are attached to the respective arms 37 by means of bolts 43 passing through the slots 42 and these shovels are provided with rounded forward ends as at 44 which are adapted to bear against the raised rivet head 40 above referred to.

It will be obvious from an inspection of the drawings that according as the position of the covering shovels is changed with relation to the bolt 43 the rear end of these shovels will be raised or lowered on account of the curved forward end contacting with the rivet head 40.

In the entire operation of the device the ground is first opened by the cutter point 20, the top of the row being leveled by the blades 17. Immediately behind the cutter point 20 the drill 21 opens the ground for the deposition of the seed. The seed is then deposited through the chute 32 as previously described, covered by the blades or shovels 41 and the earth properly packed by means of the roller 38.

There has thus been provided a novel and efficient device of the character described and for the purpose specified.

Having thus described the invention, what is claimed as new, is:—

1. In a planter, a wheel supported feed box provided with a slot in the bottom thereof, a rotatable feed wheel held to pass through said slot provided with a plurality of feeding fingers adapted to be detachably held on said wheel at different even intervals therearound, a resiliently supported rotatable agitator held in said feed box and adapted to be struck by the fingers of the feed wheel to rotate the agitator and simultaneously vibrate the same.

2. The combination with a frame, of earth working tools supported thereon, an axle rotatably mounted on the frame, wheels fixed on said axle, a feed box mounted on the frame and provided with a slot in the bottom thereof, a feed wheel fixedly mounted on said axle and extending through said slot, said feed wheel being provided with a plurality of feeding fingers adapted to be detachably held on said wheel at different even intervals therearound, and a vibrating and rotating agitator adapted to be rotated and vibrated by contact with the teeth of said feed wheel.

In testimony whereof, I affix my signature, in presence of two witnesses.

THOMAS M. WATSON.

Witnesses:
M. R. WATSON,
M. D. WATSON.